Feb. 11, 1958 F. L. McLAUGHLIN 2,822,850
METHOD OF FORMING WELDING PROJECTIONS ON A
STANDARD NUT BLANK AND ARTICLE SO FORMED
Filed Sept. 17, 1952 2 Sheets-Sheet 1

*INVENTOR.*
FRANK L. McLAUGHLIN
BY Whittemore, Hulbert
& Belknap
ATTORNEYS

Feb. 11, 1958 F. L. McLAUGHLIN 2,822,850
METHOD OF FORMING WELDING PROJECTIONS ON A
STANDARD NUT BLANK AND ARTICLE SO FORMED
Filed Sept. 17, 1952 2 Sheets-Sheet 2

INVENTOR.
FRANK L. McLAUGHLIN
BY
Whittemore, Hulbert
& Belknap
ATTORNEYS

United States Patent Office 2,822,850
Patented Feb. 11, 1958

2,822,850

METHOD OF FORMING WELDING PROJECTIONS ON A STANDARD NUT BLANK AND ARTICLE SO FORMED

Frank L. McLaughlin, Farmington, Mich., assignor to Earl E. Howe, Chicago, Ill.

Application September 17, 1952, Serial No. 310,063

9 Claims. (Cl. 151—41.7)

The present invention relates to projection weld nuts, and to methods of making them.

One object of the present invention is to provide a projection weld nut of simple construction which is easy and economical to make and to use.

More specifically, an object of the present invention is to provide a polygonal weld nut having a plurality of welding projections extending beyond one flat surface thereof and located adjacent the corners or angles thereof.

Another purpose of the present invention is to form projection weld nuts from flat stock, with their corners deformed outwardly beyond the bottom surface of the nut to form welding projections.

A further purpose of the present invention is to provide or form weld nuts from flat stock having the corners thereof deformed radially inwardly and outwardly beyond the bottom surface of the nut.

A further purpose of the present invention is to provide or form a weld nut of polygonal shape having a generally flat bottom surface and provided with welding projections located radially inwardly from the corners and extending outwardly beyond the flat bottom thereof.

Other objects and features of the invention will appear from time to time in the course of the specification and claims.

I illustrate the invention more or less diagrammatically in the accompanying drawings wherein.

Like parts are indicated by like symbols throughout the specification and drawings.

Figure 1:
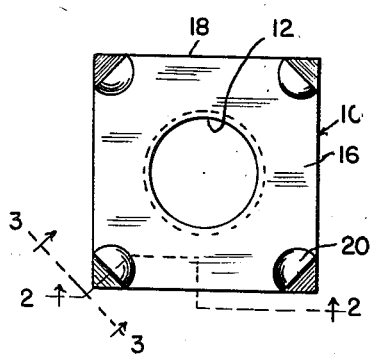
Figure 1 is a bottom plan view of a nut made by the method of the present invention.
Figure 2:
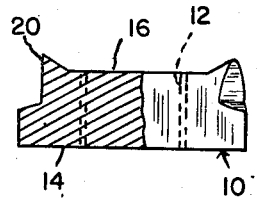
Figure 2 is a partial section on the line 2—2 of Figure 1.
Figure 3:
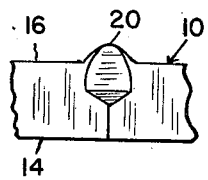
Figure 3 is a fragmentary corner elevation looking in the direction of the arrows 3—3 of Figure 1.
Figure 4:
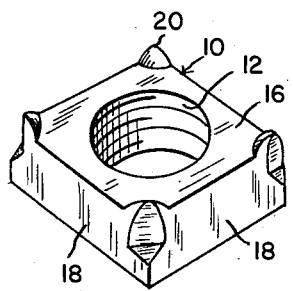
Figure 4 is a perspective view of the nut.

In production assembly of many articles, modern technique involves the provision of bolt-receiving openings in sheet metal stock for assembly with other parts having corresponding bolt-receiving openings therethrough. In many cases during the assembly of the article it becomes impossible or difficult to gain access to both sides of such registering bolt-receiving openings. Accordingly, it is necessary in these cases to provide for a temporary or permanent attachment of a nut element at the side of an article to which access is denied.

One of the methods of securing nut elements to the panel part prior to its assembly with a cooperating bolt is to projection weld the nut to the panel part in registry with the bolt receiving-opening.

According to the present invention nuts are specifically designed and formed for this purpose and are formed to provide projections located adjacent the corners thereof and extending beyond the generally flat bottom surfaces of the nut sufficiently to establish point contact with the panel. In accordance with well understood principles, the application of a welding current to the nut causes the current to divide and pass through the projections which are thus quickly heated and welded to the panel part.

The simplest and cheapest form of a nut is a squared nut formed from flat stock which is provided with a threaded central opening. I have chosen to illustrate my invention primarily in connection with such a nut and the method of its formation.

As seen, for example, in Figures 1 to 4, the nut comprises a body 10 of generally rectangular cross section provided with the threaded central opening 12. Prior to the special shaping of the nut as disclosed herein, the nut has flat top and bottom surfaces 14 and 16 respectively, and flat sides 18 intersecting in squared corners.

In accordance with the present invention that portion of the corners of the nut which are adjacent to the bottom surface 16 are deformed radially inwardly of the nut body and at the same time deformed outwardly beyond the bottom surface 16 of the nut body to provide the projections 20. Inasmuch as the projections 20 contain the original sharp bottom corners of the nut, these projections are generally pointed.

It will further be observed that the upper exposed surface of the nut is unmodified by the provision of the welding projections so that it retains its original appearance.

Conveniently, the welding projections disclosed herein may be made by the simple expedient of striking the bottom corners of the nut with forming dies which deforms the metal radially inwardly and simultaneously causes the metal to form outwardly beyond the bottom surfaces of the nut. Thus not only is the top or exposed surfaces of the nut unmodified but the welding projections are actually located radially inwardly with respect to the projected side surfaces of the nut so that in the complete assembly the welds are effectively cancelled.

Figure 5:
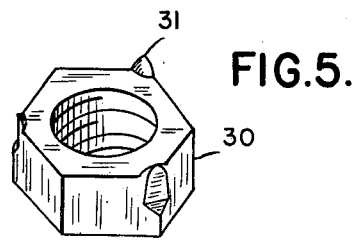
Figure 5 is a perspective view of a hexagonal nut made in accordance with my invention.

As seen in Figure 5, the invention may be applied to a hexagonal nut 30, in which case preferably alternate corners are struck as shown at 31.

Figure 6:
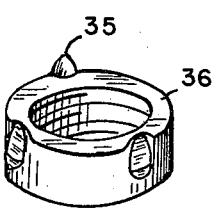
Figure 6 is a perspective view of a circular nut made in accordance with my invention.

In Figure 6, projections 35 are shown as provided at equal intervals of 120 degrees around a circular nut 36. In these last two cases, there is the advantage of three point support which insures uniform pressure and welding. The invention might equally well be embodied in a triangular nut, as will be apparent.

Figure 7:
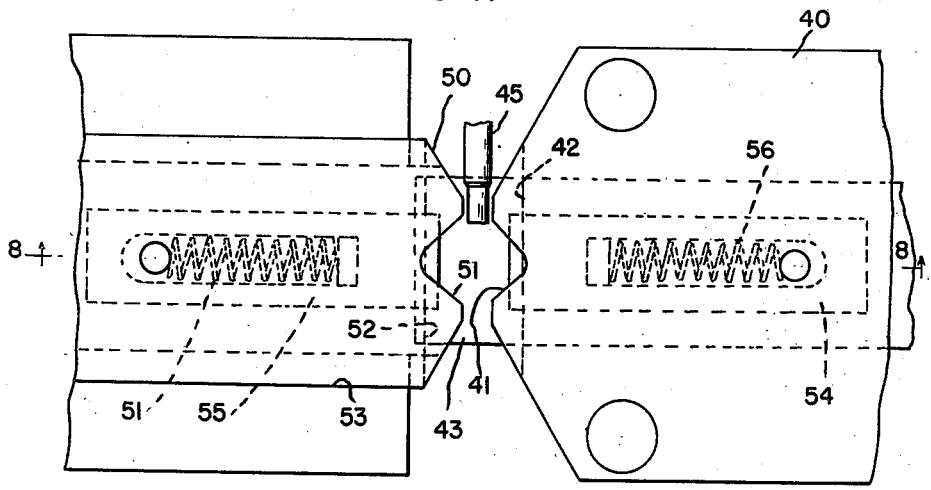
Figure 7 is a fragmentary view of typical apparatus for shaping the nut in accordance with my method.
Figure 8:
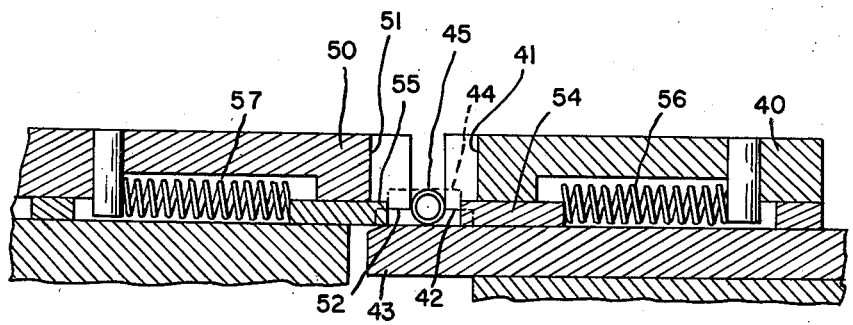
Figure 8 is a section on the line 8—8, Figure 7.

Referring now to Figures 7 and 8, the apparatus for forming the welding projections is illustrated. A stationary die 40 is provided with a notch 41, and is undercut as shown at 42 so as to engage only the upper portion of a nut corner. A slidable support 43 for the nut 44 is provided which is withdrawn to the right after each operation, dropping the finished nut into a suitable receiver.

A stop 45 is provided against which a nut is fed, and serves to locate the nut for the subsequent operation.

A movable die 50, notched as seen at 51 and undercut as shown at 52, is provided for sliding movement in guide ways seen at 53.

In fixed die 40 and movable die 50 are provided centering pads 54 and 55, respectively. These pads are spring pressed by springs 56 and 57, respectively, and yield as the dies approach. They serve to orient the nut to present the desired corners for shaping.

While I have shown and described several forms of my invention, in Figures 1 through 6, it should be understood that the inventive concept can be embodied in more than one form of nut, in fact many more than those shown, and I wish it to be understood that I do not intend to be limited to the specific nuts shown, except as expressed in the appended claims. Also, the apparatus and the method performed thereby in Figures 7 and 8 are only illustrative of apparatus for carrying out the method of the invention and it should be understood that I do not intend to be limited to the apparatus and method contained therein, except as expressed in the appended claims.

I claim as my invention:

1. The method of forming a discrete weld nut from a discrete blank consisting of a standard nut of standard nut stock, having only a pair of generally flat, generally parallel end surfaces of equal area and flat side surfaces meeting at corner edges intersecting the end surfaces to form sharp points with a central threaded opening extending into said nut perpendicularly from one end surface thereof, which includes positioning such a nut in a zone of treatment with said end surface unconfined axially outwardly thereof adjacent its corner areas, and there exerting lateral inward pressure of metal deforming intensity along inwardly converging radii extending through the nut corner edges against corner areas of the nut at corner pressure zones having a substantial axial extension, continuing such pressure inwardly along such radii against progressively increasing pressure surface areas of substantial axial extension and of substantial lateral extension transversely of such radii extending through such nut corner edges, directing said pressure to distort said sharp points axially bodily beyond said end surface while maintaining them solidly connected to the body of the nut at the periphery thereof, to form welding projections with indented surfaces extending diagonally between adjacent side surfaces, and discontinuing such lateral pressure with the axially distorted points of said welding projections more remote from the center of the nut than are the intermediate undistorted parts of the flat side surfaces, and with said nut being distorted only at corner portions.

2. That method according to claim 1, wherein said lateral inward pressure against said corner edges is initially applied against corner pressure zones, each consisting of an axially extending line formed by one of said corner edges.

3. That method according to claim 1, wherein said lateral inward pressure is applied along inwardly converging radii extending through the nut corner edges.

4. That method according to claim 1, wherein said welding projections are so formed as to extend beyond said end surface a distance less than the maximum width thereof measured transversely at said end surface.

5. An article comprising a discrete nut made from a discrete blank consisting of a standard nut of standard nut stock, having only a pair of generally flat, generally parallel end surfaces of equal area and flat side surfaces meeting at corner edges intersecting the end surfaces to form sharp points with a central threaded opening extending into said nut perpendicularly from one end surface thereof and having at least three welding projections extending axially from said end surface at the corners thereof, said welding projections being symmetrically disposed about the periphery of said nut and being formed in accordance with the method defined in claim 1.

6. The method of forming a discrete weld nut from a discrete blank consisting of a standard nut of standard nut stock, having generally flat, generally parallel end surfaces and flat side surfaces meeting at corner edges intersecting the end surfaces to form sharp points at the outer periphery of the nut, which includes positioning such a nut in a zone of treatment and upsetting the metal of the nut at least a pair of said adjacent corners to form a welding projection adjacent each said corner extending axially beyond an end surface of the nut, and including such sharp point, by applying to the nut a lateral force having oppositely directed components of metal deforming intensity along inwardly converging radii extending through the nut corner edges simultaneously operative upon the corner areas of the nut to be upset, continuing such force until the sharp corner points of said adjacent corners of the nut have been displaced inwardly toward the center of the nut and axially outwardly of the adjacent end surface of the nut to a desired extent to form welding projections with diagonal indentations extending between adjacent side surfaces while maintaining such projections solidly connected to the body of the nut at the periphery thereof, and discontinuing the application of said force when the sharp pointed and axially distorted welding projections thus formed are still more remote from the center of the nut than are the intermediate undistorted parts of the flat side surfaces, and with said nut distorted only at corner portions.

7. The method of forming a discrete weld nut from a discrete blank consisting of a standard nut of standard nut stock, having only a pair of generally flat, generally parallel end surfaces and flat side surfaces meeting at corner edges intersecting the end surfaces to form sharp points with a threaded opening extending into said nut perpendicularly from one end surface thereof; which includes the steps of positioning such a nut in a zone of treatment with said one of its end surfaces unconfined axially outwardly thereof adjacent its corner areas and there exerting lateral inward pressure of metal deforming intensity along inwardly converging radii extending through the nut corner edges and against said corner edges near the midpoint thereof, continuing such pressure inwardly against progressively increasing pressure surface areas of substantial axial extension and of substantial lateral extension transversely of such radii extending through such nut corner edges, directing said pressure to distort said sharp points axially bodily beyond only the said one end surface without otherwise distorting such end surface and while maintaining said sharp points solidly connected to the body of the nut at the periphery thereof, to form welding projections with indented substantially flat surfaces extending diagonally between adjacent side surfaces, and discontinuing such lateral pressure with the axially distorted points of said welding projections more remote from the center of the nut than are the intermediate undistorted parts of the flat side surfaces, said method being characterized in that all of the welding projections on such end surface are so formed simultaneously in one continuous operation.

8. The method of forming a discrete weld nut from a discrete blank consisting of a standard nut having only a pair of generally flat, generally parallel end surfaces and flat side surfaces meeting at corner edges intersecting the end surfaces to form corners with a threaded opening extending into the nut perpendicularly from one end surface thereof, which includes positioning such a nut in a zone of treatment with said end surface unconfined axially outwardly thereof adjacent its said corners, and there exerting lateral inward pressure of metal deforming intensity against said corner edges adjacent said corners of the nut, continuing such pressure inwardly toward said threaded opening against progressively increasing pressure surface areas of substantial axial extension and of substantial lateral extension transversely of radii extending through such nut corner edges, distorting said corners axially bodily beyond said end surface while maintaining them solidly connected to the body of the nut at the peripheral surface thereof to form tapering welding projections with indented substantially flat surfaces extending diagonally between adjacent side surfaces, and discontinuing such lateral pressure with the tips of said welding projections more remote from the center of the nut than are the intermediate undistorted parts of the flat side surfaces, and with said nut being distorted only at corner portions, said method being characterized in that all of the welding projections on said end surface are so formed simultaneously in one continuous operation.

9. An article comprising a discrete nut made from a discrete blank consisting of a standard nut having only a pair of generally flat, generally parallel end surfaces and flat side surfaces meeting at corner edges intersecting the end surfaces to form corners with a threaded opening extending into the nut perpendicularly from one end surface thereof and having at least three welding projections extending axially from said end surface at the corners thereof, said welding projections being symmetrically disposed about the periphery of said nut and being formed in accordance with the method defined in claim 8.

References Cited in the file of this patent

UNITED STATES PATENTS

| | | |
|---|---|---|
| 2,054,187 | Almdale | Sept. 15, 1936 |
| 2,073,467 | Demboski et al. | Mar. 9, 1937 |
| 2,123,843 | Cox | July 12, 1938 |
| 2,167,285 | Smith | July 25, 1939 |
| 2,179,398 | Briggs | Nov. 7, 1939 |
| 2,208,532 | Woodward | July 16, 1940 |
| 2,443,815 | Dahl | June 22, 1948 |